United States Patent [19]

León-Betanzos et al.

[11] Patent Number: 5,498,337
[45] Date of Patent: Mar. 12, 1996

[54] PROCEDURE FOR BIODEGRADATION OF WASTE MATERIALS FROM CRUDE OIL

[75] Inventors: Apolinar León-Betanzos; Jose L. M. Cortina, both of Cuauhtemoc, Mexico

[73] Assignee: Grupo Internacional Marc S.A. de C.V., Cuauhtemoc, Mexico

[21] Appl. No.: 387,285

[22] Filed: Feb. 10, 1995

[30] Foreign Application Priority Data

Nov. 14, 1994 [MX] Mexico .................................. 59857

[51] Int. Cl.$^6$ ........................................ C02F 11/02
[52] U.S. Cl. ................... 210/610; 210/631; 210/747; 210/922; 71/25; 435/281
[58] Field of Search ........................ 210/610, 611, 210/631, 908, 922, 747; 71/25; 435/281

[56] References Cited

U.S. PATENT DOCUMENTS

| | | | |
|---|---|---|---|
| 3,929,586 | 12/1975 | Slikkers, Jr. | 71/25 |
| 3,933,627 | 1/1976 | Fusey | 210/610 |
| 4,385,121 | 5/1983 | Knowlton | 210/610 |
| 4,494,975 | 1/1985 | De Boodt et al. | 71/25 |
| 5,286,140 | 2/1994 | Mather | 210/747 |
| 5,334,312 | 8/1994 | Lajoie | 210/610 |
| 5,362,397 | 11/1994 | Cyr | 210/631 |

Primary Examiner—Christopher Upton
Attorney, Agent, or Firm—Harrison & Egbert

[57] ABSTRACT

A process for biodegradation of crude oil wastes and for recovery of contaminated land including the steps of extracting sludges containing the wastes, collecting the sludges into a container, mixing an alkaline salt with the sludges so as to react the salt with the sludges under a generally constant degree of humidity, adding black earth to the mixed alkaline sludges so as to neutralize the alkaline sludges and to degrade the oil wastes through chemical reactions, adding a material to the neutralized sludges so as to enrich the sludges, and forming a humus of the neutralized sludges by the organic degradation of the neutralized sludges through fermentation or putrefaction. The material added to the neutralized sludges so as to enrich the sludges can be selected from the group including sawdust, rice husks, sugar cane bagasse, and animal excrement.

7 Claims, No Drawings

PROCEDURE FOR BIODEGRADATION OF WASTE MATERIALS FROM CRUDE OIL

TECHNICAL FIELD

The present invention relates to processes for the biodegradation of waste materials from crude oil.

SUMMARY OF THE INVENTION

A procedure is presented for biodegradation of oil wastes and oily sludges located in oil extraction fields that cause so much damage to the environment, polluting the countryside, the water-bearing strata and nature itself, whereby following application of this procedure, these polluted fields or areas recover their natural state.

The proposed procedure includes some procedural stages which can be summed up as a stage of extraction and collection of sludges with crude oil residues, using heavy machinery when there are dense sludges and submersible pumps for light sludges; a stage of alkalinization of sludges, these being mixed with alkaline materials such as soda, potassium or lime, and moistened with a certain frequency; a stage of neutralization of the sludges by adding black earth or "vega" rich in organic nutrients and bacteria; a stage of enrichment of the sludge through addition of organic matter such as sugar cane bagasse and animal manure; a stage of degradation of the resulting compound, causing fermentation or putrefaction by means of the bacteria, with frequent irrigation, until obtaining a humus. In this way, the crude oil wastes are transformed through fermentation or putrefaction into more simple organic wastes which are ultimately transformed into water and carbon dioxide, which is fixed with the respective hydroxide in carbonate form. The double chain bonds of oil wastes are broken and transformed into saturated chains and simpler compounds at the time the "vega" earth is added, given its acid characteristics, favoring the development of bacteria at the time of neutralization.

This procedure has been developed primarily to recover the land of fields that are polluted by crude oil. However, this same procedure can be widely used to recover lands polluted by other organic wastes from other sources, such as garbage, and therefore, we can say that it is not restricted to oil wastes.

Consequently, the proposed procedure has its field of action in ecology and especially as a method for cleaning and recovering contaminated lands.

BACKGROUND OF THE INVENTION

Accidental crude oil spills are caused in oil extraction fields as well as the exit of sludges accompanied by oil wastes, which pollute the environment. These residues sometimes in liquid form are again introduced into the earth and consequently gradually damage the mantle, also disturbing the water-bearing strata.

Although efforts have been increased in order to avoid spills, given the nature of the operations during oil extraction, this is inevitable, since the oil ducts often have to be cleaned ad undesirable materials that accompany the oil separated out.

Generally, waste dams are built which remain as pollutants once the well is exhausted.

This invention is proposed in order to avoid these dams remaining and to return these oil residues and sludges to nature with a useful value for normal use.

According to the best of the knowledge of the authors of this invention, conductive methods for recovering these sludges have not been developed, since only a procedure for separating oil by leaching has been developed, with rather poor results.

This method competes advantageously if compared against a leaching method, because it uses conventional materials whose cost is not a strong factor, since the work of converting the oil wastes to alcohols and their degradation is done by anaerobic bacteria that are found in nature.

On the other hand, the time for biodegrading waste materials is not really definitive, because while the well is operating the wastes located in dams can be biodegrading without this operation being an impediment in the first stage, that is, the oil extraction stage. Once the well is exhausted and the field is closed, the micro-organisms will continue working until a humus is obtained, with the field continuing to be useful for other purposes and without any pollution.

DETAILED DESCRIPTION OF THE PRESENT INVENTION

The characteristics details of this invention are suitably described as follows:

The first stage of the biodegradation procedure begins with the collection and extraction of the waste sludge with crude oil. This operation is done by collecting the sludges that are found in the dam. When these sludges are highly dense, the work can be done by using diggers and similar machines, that is, with heavy machinery. When the waste sludges have a light consistency, operations are facilitated and they can be handled with submersible pumps. In either form, the sludges extracted and collected from the dam are transferred to a flat surface to be mixed with the other components that follow. It is also possible to do the subsequent operations in a vat with an appropriate capacity of approximately 7 M3.

When the subsequent stages have concluded, the deposit is emptied out in order to receive a new load or lot.

The following stage includes mixing and alkalinizing the waste sludges with alkaline salts. This mixing can be done manually, using spades or cement-type mixers or more complex equipment. During this stage, a constant degree of moisture must be maintained to provide homogeneity, and at the same time, to ensure an appropriate means for development of bacteria, fungi and yeasts. It is appropriate to stab and mix it with a spade constantly. Normally, sodium hydroxide, potassium hydroxide and calcium hydroxide are used as neutralizers. The last mentioned is usually chosen because it is easily obtained and handled. It combines first with the organic material which it partially transforms into humus, and then is neutralized in the form of calcium carbonate.

The third stage includes neutralization of the mixture of sludges with lime by adding black earth or "vega". This earth can be easily obtained and is found around oil fields; therefore, transporting and freighting it is very simple. On the other hand, a typical chemical analysis of the earth shows results of carbon, oxygen, hydrogen, nitrogen, phosphorous, potassium, sulfur, calcium, magnesium, iron, silicon, aluminum, chloride, and sodium. Although the analytical results may vary, the components are practically the same. Further, this earth is rich in bacteria that are found in the mantle doing nitrification metabolism. The addition of this "vega" earth over the alkalinized waste sludges speeds up the neutralization and at the same time the oil wastes are degraded through a chemical reaction in which the bacteria incorporate the organic matter from the environment and return it to the environment as water and carbon dioxide which is fixed with the lime to form calcium carbonate. This stage is slow, since the cycle of transforming the organic matter by bacteria occurs with low reaction speeds.

A characteristic of black or "vega" earth is its acidity, which reacts with the double bonds of the oil waste chains, which are transformed into simpler chains, favoring the development of bacteria at the time of neutralization.

In order to speed up the process of transforming the organic material, compounds are added that have a higher organic content. Sawdust, rice husks, sugar cane bagasse and animal manure are preferentially chosen. This mixture with the different substances must be kept with a high degree of moisture. As proof of decomposition of the organic matter, it takes on a dark brown color that is found in the colloidal fraction of the soil. Its decomposition is complex and varied. An important soluble fraction is distinguished in the alkaline solutions (mould acids); another fraction is constituted by technical compounds, compounds of a ligneous nature and of mould acids strongly bound to the clays. The sugar cane bagasse used is rich in glucides that accelerate the alcoholic fermentation, that is, the transformation and unfolding of the sugar into alcohol and from there to carbon dioxide and water. While the quality of the manure depends on its component elements and also on the type of animal. Thus, for example, horse and lamb manure is richer than that of bovine cattle and pigs, since it ferments more rapidly. The addition of both sugar cane bagasse or sawdust and animal excrement favors the development of humidifying agents and in the end, greater fermentation.

An explanation of the chemistry of this alcoholic fermentation process is highly complicated, but for this paper, it is sufficient to see the practical results in the sense of transforming sludges with oil wastes into clean earth, thanks to bacterial biodegradation.

Lastly, some bacteria are capable of transforming organic matter and combining metals to form inorganic acids and gases, originating a putrefaction process. The materials bacteria prefer are those rich in proteins. Once in the organic medium, the bacteria segregate substances that attack the proteins in order to decompose them into simpler compounds which are those that serve as food. The disintegration of the organic materials originates many substances: water, different acids and several gases, like hydrogen, carbon dioxide, ammonium and sulfuric acid, responsible for the characteristics odors. When decomposing matter, finally resulting in mineral compounds, the putrefaction bacteria collaborate to clean the environment of the enormous quantity of organic wastes that are produced.

To ensure that sludges with oil residues are biodegraded, an analysis is done to appraise the corrosiveness, reactivity, explosiveness, toxicity, flammability and biological parameters.

We claim:

1. A process for biodegradation of crude oil wastes and for recovery of contaminated land comprising the steps of:

extracting sludges containing the wastes;

collecting said sludges into a container;

mixing an alkaline salt with said sludges so as to react said salt with said sludges under a generally constant degree of humidity;

adding black earth to the mixed alkaline sludges so as to neutralize the alkaline sludges and to degrade the oil wastes through chemical reactions;

adding a material to the neutralized sludges so as to enrich the sludges, and material selected from the group consisting of: sawdust, rice husks, sugar cane bagasse, and animal excrement, said step of adding a material being in a high humidity condition;

forming a humus of the neutralized sludges by the organic degradation of such neutralized sludges by fermentation or putrefaction.

2. The method of claim 1, said step of extracting being carried out with diggers where such sludges are relatively dense.

3. The method of claim 1, said step of extracting being carried out by submersible pumps where such sludges are relatively light.

4. The method of claim 1, said alkaline salt selected from the group consisting of: sodium hydroxide, potassium hydroxide, hydrated limes, and a mixture thereof.

5. The method of claim 1, said black earth being vega earth.

6. The method of claim 1, said black earth containing an existing bacteria, said step of neutralizing comprising:

incorporating organic material in the alkaline sludge into the existing bacteria;

returning the incorporated organic material in the form of water and carbon dioxide; and fixing remaining alkaline salt in a form of carbonates.

7. The method of claim 1, said step of neutralizing comprising the step of:

breaking double bonds in the alkaline sludges into simpler chains so as to create acidity characteristics.

\* \* \* \* \*